(12) United States Patent
Weller et al.

(10) Patent No.: US 10,824,704 B2
(45) Date of Patent: Nov. 3, 2020

(54) TWO FACTOR BIOMETRIC AUTHENTICATION FOR AUTO

(71) Applicant: Gentex Corporation, Zeeland, MI (US)

(72) Inventors: Andrew D. Weller, Holland, MI (US); Thomas S. Wright, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 261 days.

(21) Appl. No.: 15/881,006

(22) Filed: Jan. 26, 2018

(65) Prior Publication Data

US 2018/0247037 A1 Aug. 30, 2018

Related U.S. Application Data

(60) Provisional application No. 62/463,218, filed on Feb. 24, 2017.

(51) Int. Cl.
| | |
|---|---|
| *G06F 21/32* | (2013.01) |
| *G06K 9/00* | (2006.01) |
| *G06F 21/44* | (2013.01) |
| *G06F 21/34* | (2013.01) |
| *G06F 21/40* | (2013.01) |

(52) U.S. Cl.
CPC .............. *G06F 21/32* (2013.01); *G06F 21/34* (2013.01); *G06F 21/40* (2013.01); *G06F 21/44* (2013.01); *G06K 9/00362* (2013.01); *G06K 9/00604* (2013.01); *G06K 9/00832* (2013.01); *G06K 9/00892* (2013.01); *G06K 9/00006* (2013.01); *G06K 9/00302* (2013.01); *G06K 9/00335* (2013.01)

(58) Field of Classification Search
CPC . A61J 1/10; A61J 1/201; A61J 1/2089; G06K 9/00409; G06K 9/00624; H04N 5/2256
See application file for complete search history.

(56) References Cited

U.S. PATENT DOCUMENTS

| | | |
|---|---|---|
| 5,708,415 A | 1/1998 | Van Lente et al. |
| 5,854,593 A | 12/1998 | Dykema et al. |
| 6,091,343 A | 7/2000 | Dykema et al. |
| (Continued) | | |

OTHER PUBLICATIONS

Search Report and Written Opinion of the International Searching Authority, International Application No. PCT/US2018/015453, dated Aug. 30, 2018 (10 pages).

*Primary Examiner* — Mekonen T Bekele
(74) *Attorney, Agent, or Firm* — Price Heneveld LLP; Bradley D. Johnson (57) ABSTRACT

An authentication system for a vehicle comprises a first scanning apparatus, a second scanning apparatus, and a controller. The controller is configured to receive a request for vehicle entry and capture first scanning data with the first scanning apparatus in response to the request. The controller is further configured to process a first comparison of the first scanning data to grant access to a passenger cabin of the vehicle. The controller is further configured to capture second scanning data with the second scanning apparatus to activate a privilege level associated with an identification profile of an occupant. The privilege level is communicated to the controller to define a level of access and control to one or more systems of the vehicle.

18 Claims, 5 Drawing Sheets

(56) References Cited

U.S. PATENT DOCUMENTS

| | | | |
|---|---|---|---|
| 6,271,745 B1* | 8/2001 | Anzai | G07C 9/00158 340/5.23 |
| 6,572,233 B1 | 6/2003 | Northman et al. | |
| 7,138,904 B1 | 11/2006 | Dutu | |
| 7,898,385 B2 | 3/2011 | Kocher | |
| 8,237,909 B2 | 8/2012 | Ostreko et al. | |
| 8,339,526 B2 | 12/2012 | Minikey, Jr. et al. | |
| 8,344,849 B2* | 1/2013 | Larsson | B60R 25/25 340/426.11 |
| 8,392,965 B2* | 3/2013 | Carter | G06F 21/34 382/115 |
| 8,411,245 B2 | 4/2013 | Lee et al. | |
| 8,631,494 B2* | 1/2014 | Hamid | G06F 21/80 726/24 |
| 8,768,565 B2* | 7/2014 | Jefferies | G07B 15/00 701/32.7 |
| 9,663,067 B2* | 5/2017 | Penilla | G06Q 20/32 |
| 9,916,769 B2* | 3/2018 | Wright | G09B 19/167 |
| 2004/0217850 A1 | 11/2004 | Perttunen et al. | |
| 2005/0092844 A1* | 5/2005 | Zhang | G06K 7/0004 235/487 |
| 2006/0125610 A1* | 6/2006 | Lemoult | B60R 25/24 340/426.1 |
| 2008/0319665 A1* | 12/2008 | Berkobin | G07C 5/085 701/469 |
| 2010/0060412 A1* | 3/2010 | Johnson | B60R 25/04 340/5.53 |
| 2011/0057034 A1* | 3/2011 | Maxwell | G06Q 20/346 235/382 |
| 2011/0205016 A1* | 8/2011 | Al-Azem | G06F 21/32 340/5.52 |
| 2013/0211623 A1* | 8/2013 | Thompson | B60L 1/003 701/2 |
| 2013/0317693 A1* | 11/2013 | Jefferies | G07B 15/00 701/31.5 |
| 2014/0176301 A1* | 6/2014 | Fernandez Banares | G07C 9/00015 340/5.26 |
| 2014/0282931 A1 | 9/2014 | Protopapas | |
| 2016/0082926 A1* | 3/2016 | Mouser | B60R 25/01 701/2 |
| 2016/0098870 A1* | 4/2016 | Bergerhoff | G07C 9/20 340/5.61 |
| 2016/0260269 A1 | 9/2016 | Pietschmann | |
| 2016/0379183 A1* | 12/2016 | Holman | G06Q 20/04 705/44 |
| 2017/0127230 A1* | 5/2017 | Enriquez | H04L 67/18 |
| 2017/0316621 A1* | 11/2017 | Jefferies | G07C 5/008 |
| 2018/0247037 A1* | 8/2018 | Weller | G06K 9/00892 |
| 2019/0039570 A1 | 2/2019 | Foster et al. | |

\* cited by examiner

TWO FACTOR BIOMETRIC AUTHENTICATION FOR AUTO

CROSS-REFERENCE TO RELATED APPLICATION

This application claims priority to and the benefit under 35 U.S.C. § 119(e) of U.S. Provisional Patent Application No. 62/463,218, filed on Feb. 24, 2017, entitled "TWO FACTOR BIOMETRIC AUTHENTICATION FOR AUTO," the entire disclosure of which is hereby incorporated herein by reference.

TECHNOLOGICAL FIELD

The present disclosure relates generally to a security accessory for a vehicle and more particularly relates to security accessory configured to assist in an authentication of a vehicle occupant.

SUMMARY

In one aspect of the present disclosure, an authentication system for a vehicle is disclosed. The authentication system comprises a first scanning apparatus, a second scanning apparatus, and a controller. The first scanning apparatus is configured to capture first scanning data. The first scanning apparatus is accessible from an exterior of the vehicle. The second scanning apparatus is configured to capture second scanning data. The second scanning apparatus is accessible from an interior of the vehicle. The controller is in communication with the scanning apparatuses.

The controller is configured to receive a request for vehicle entry and capture the first scanning data with the first scanning apparatus in response to the request for vehicle entry and grant access to a passenger cabin of the vehicle based on the first scanning data indicating an authorized occupant. The controller is also configured to capture the second scanning data with the second scanning apparatus and activate a privilege level for an identification profile of the authorized occupant based on the second scanning data. The privilege level defines a level control of one or more systems of the vehicle.

In another aspect of the present disclosure, a method for authorizing a use of a vehicle is disclosed. The method comprises receiving a request entry of the vehicle and capturing a first scanning data in response to the request. The method further comprises processing the first scanning data in the first comparison to a first authentication data and granting access to a passenger cabin based on the comparison indicating an authorized occupant. The method further comprises capturing a second scanning data in response to the access to the passenger cabin and processing a second comparison of the second scanning data to the second authentication data. The method may continue by controlling a privilege level for the identification profile of the authorized occupant based on the second scanning data and activating one or more systems of the vehicle for use in response to the privilege level.

In yet another aspect of the present disclosure, an authentication system for a vehicle is disclosed. The system comprises a communication circuit configured to communicate with a remote server. The system further comprises a first scanning apparatus, a second scanning apparatus, and a controller in communication with the communication circuit and the scanning apparatuses. The first scanning apparatus is configured to capture first scanning data and is accessible from an exterior of the vehicle. The second scanning apparatus is configured to capture second scanning data and is accessible from an interior of the vehicle.

The controller is configured to process a first scanning data in response to a request for vehicle entry, access a first authentication data via the remote server, and grant access to a passenger cabin of the vehicle based on the first scanning data indicating an authorized occupant. The controller is further configured to capture the second scanning data with the second scanning apparatus, access a second authentication data via the remote server, and activate a privilege level for the identification profile based on the second scanning data. The privilege level defines a level control of one or more systems of the vehicle.

These and other features, advantages, and objects of the present device will be further understood and appreciated by those skilled in the art upon studying the following specification, claims, and appended drawings.

DETAILED DESCRIPTION OF EMBODIMENTS

Figure 1:
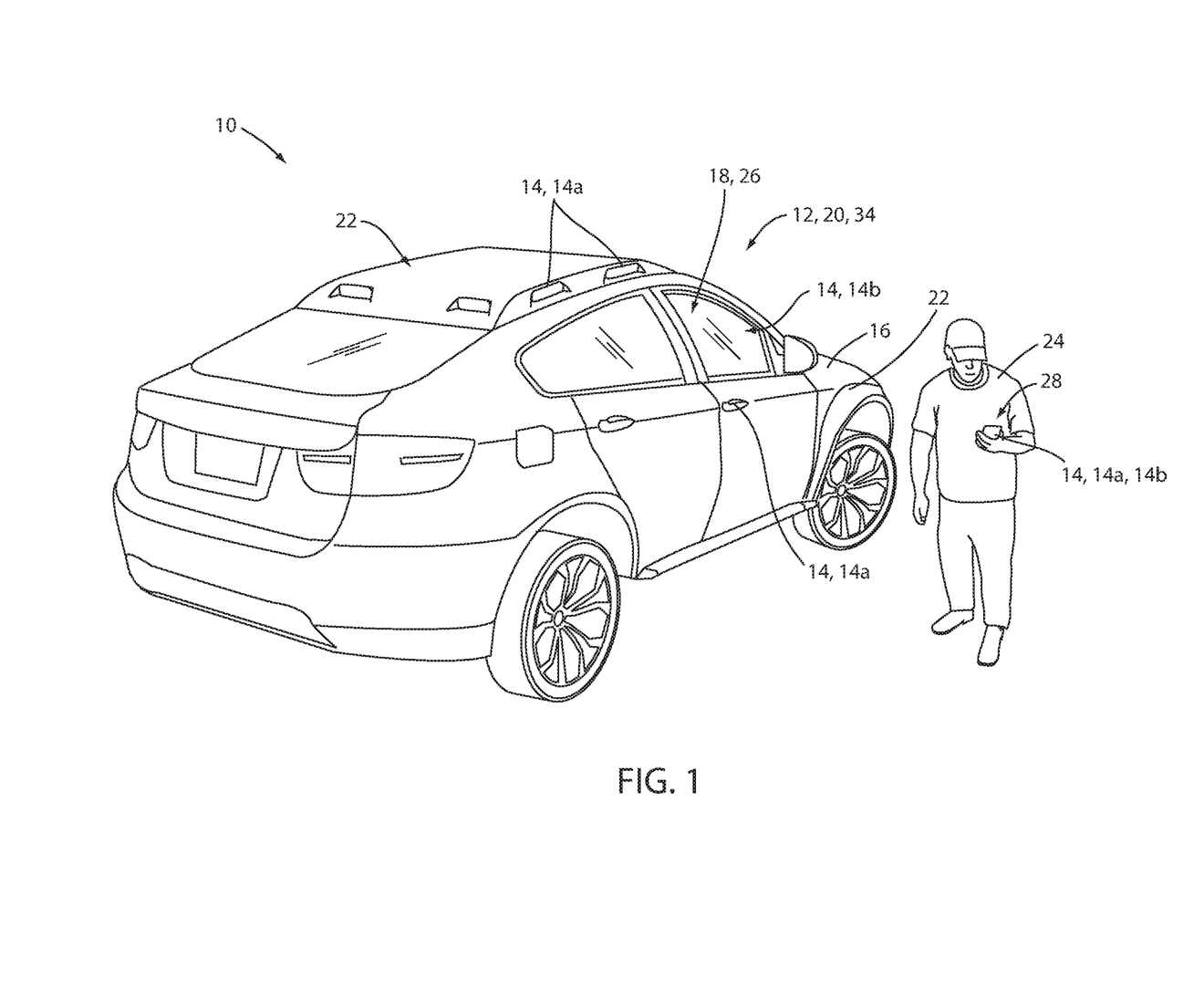
FIG. 1 is a projected view of a vehicle comprising an authentication system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In various embodiments, the disclosure provides for an authentication system for a vehicle. The authentication system may be configured to capture identifying information for an occupant in order to authorize specific vehicle functions or operations. For example, in some embodiments, the disclosure may provide for a scanning apparatus configured to detect one or more identifying characteristics of an occupant or potential occupant attempting to enter the vehicle. The scanning apparatus may be incorporated in one or more vehicle systems as further provided in the following detailed description.

Referring to FIG. 1, a projected view of a vehicle 10 comprising an authentication system 12 is shown. The vehicle 10 may correspond to a conventional passenger vehicle, an autonomous vehicle, or a wide variety of automotive vehicles. The authentication system 12 may comprise a scanning apparatus 14 incorporated on an exterior portion 16 and/or disposed within an interior cabin 18 of the vehicle 10. Accordingly, the scanning apparatus 14 may be flexibly configured to provide for a collection or capture of scanning data or biometric data to support an identity authentication for the authentication system 12. In some embodiments, the authentication system 12 may be in communication with a vehicle control system 22, which may be configured to control a variety of systems and subsystems of the vehicle 10 (e.g. an engine control unit, a navigation system, a vehicle guidance system, a cabin control module, etc.).

The scanning apparatus 14 may correspond to a biometric scanner configured to capture biometric data or scanning data of an occupant 24 or a potential occupant of the vehicle 10. For example, the scanning apparatus 14 may correspond to an iris imager or scanner, fingerprint scanner, face imager or scanner, voice scanner/recorder, or various other scanning devices. The scanning data captured by and/or associated with the scanning apparatus 14 may be saved in a local memory or remote cloud server that may be accessible via a wireless communication interface. In this way, the authentication system 12 may access the local memory or a remote server to search and match scanning data or biometric data to an identification profile to identify the occupant 24. For clarity, a passenger, rider, and operator of the vehicle 10 will all be referred to as the occupant 24 of the vehicle 10.

As discussed herein, the terms identification and authentication may generally refer to an analysis completed by the authentication system 12 configured to identify the occupant 24 or a potential occupant of the vehicle 10. The disclosure provides for various embodiments configured to provide at least one authentication routine configured to securely indicate an identity of the occupant 24. Accordingly, the authentication may provide for an identification of an authenticated or registered occupant and grant access and/or privileges to modify or control various features of the vehicle 10. In some embodiments, the system 12 may similarly be configured to access an identification profile configured to provide for the authentication of the occupant 24.

Based on the identification profile, the authentication system 12 may access and/or update a variety of preferences and/or operational parameters of the vehicle 10. For example, the authentication system 12 may be configured to authenticate the occupant 24 and communicate the authentication to the vehicle control system 22. In response to the authentication of the occupant 24, the authentication system 12 may be configured to receive or identify a plurality of occupant parameters associated with the occupant 24 and the identification profile. The occupant parameters may include, but are not limited to, one or more of the following settings or preferences: a seat position, preset configurations (e.g. radio stations, media channels, light/display settings), themes, colors, control preferences, and various additional configurable attributes of the vehicle 10. The occupant parameters may also include information identifying a payment account, an authorization to apply a charge to the payment account, and a predetermined spending limit indicated for the payment account.

For example, in an exemplary embodiment, radio station presets may be changed or set according to the profile of the occupant 24. The occupant 24 may then access and update the radio station presets on a media interface 26 or any suitable display or user interface. Additionally, navigation and/or map display settings of a navigation system may be updated or configured according to a profile comprising occupant parameters for the occupant 24. In such implementations, the profile may load a variety of pre-established navigation or display preferences, commonly visited locations, preferred travel routes, etc., in response to the authentication of the identity of the occupant 24. As further discussed herein, the identification profile, control preferences, and administrative privileges designated for the occupant 24 may be stored locally and/or accessed on a remote server.

In some embodiments, the authentication system 12 may be configured to access and control various home automation services based on the identification profile of the occupant 24. For example, the authentication system 12 may correspond to or be in communication with a trainable wireless accessory configured to control a remote electronic system or device. In this way, the authentication system 12 may be operable to access encoding and/or security information from or associated with the identification profile of the occupant 24. In this way, the authentication system 12 may access and load programming instructions for a trainable wireless accessory to control a variety of remote devices based on the authentication of the occupant 24. Remote devices may include, but are not limited to, motorized barriers, locks, lights, and a variety of so-called "smart-home" devices. In an exemplary embodiment, the security accessory may correspond to a Homelink® trainable transceiver and may be constructed according to one or more embodiments disclosed in U.S. Pat. No. 6,091,343; 5,854,593 or 5,708,415, which are herein incorporated by reference in their entirety.

In some embodiments, the vehicle 10 may correspond to an autonomous vehicle and/or ride-share vehicle. The vehicle 10 may comprise one or more sensors (e.g. cameras, ultrasonic devices, capacitive sensors, etc.) some of which may be utilized as scanning apparatuses 14 as discussed herein. In such applications, the authentication of the occupant 24 may be advantageous to provide access and/or control a level of operation or administration of one or more operational controls of the vehicle 10. In an exemplary embodiment, the authentication system 12 may be configured to capture first scanning data with a first scanning apparatus 14a. The first scanning apparatus 14a may be located on an exterior portion 16 outside the vehicle 10 or may be portable as exemplified by a mobile device 28. In this way, the first scanning apparatus 14a may capture the first scanning data such that the authentication system 12 may provide for a first authentication to authorize entry into the vehicle 10 and/or load a custom profile including occupant parameters for the occupant 24.

In various embodiments, the mobile device 28 may be utilized to scan or capture scanning data or biometric data as discussed herein. The mobile device 28 may correspond to a portable computer, smartphone, personal data assistant (PDA), cellular telephone, or a variety of electronic devices. In such embodiments, the mobile device 28 may be configured to serve as a scanning apparatus 14. In this way, the authentication system 12 may provide for authentication from a variety of devices, which may be incorporated with the vehicle 10 and/or in communication with the vehicle 10. Further detailed discussion of the mobile device 28 is provided in reference to FIG. 5.

In embodiments utilized by a variety of operators or passengers (e.g. a ride share, taxi, autonomous vehicle, etc.), it may not be viable to maintain authentication data for all potential users. Accordingly, the authentication system 12 and the mobile device 28 may be in communication with a remote server. The remote server may be configured to store identification profiles, operational privileges and/or administrative privileges, or any other information related to the operation of the vehicle 10 and/or the authentication system 12. Additionally, the remote server may be configured to process and scan biometric data or scanning data to communicate identifications, authentications, validations of authorization to the authentication system 12 and/or the mobile device 28. Accordingly, the authentication system 12 and/or the mobile device 28 may access one or more identification or authentication databases remotely via communication circuits in communication with the remote server.

Figure 2:
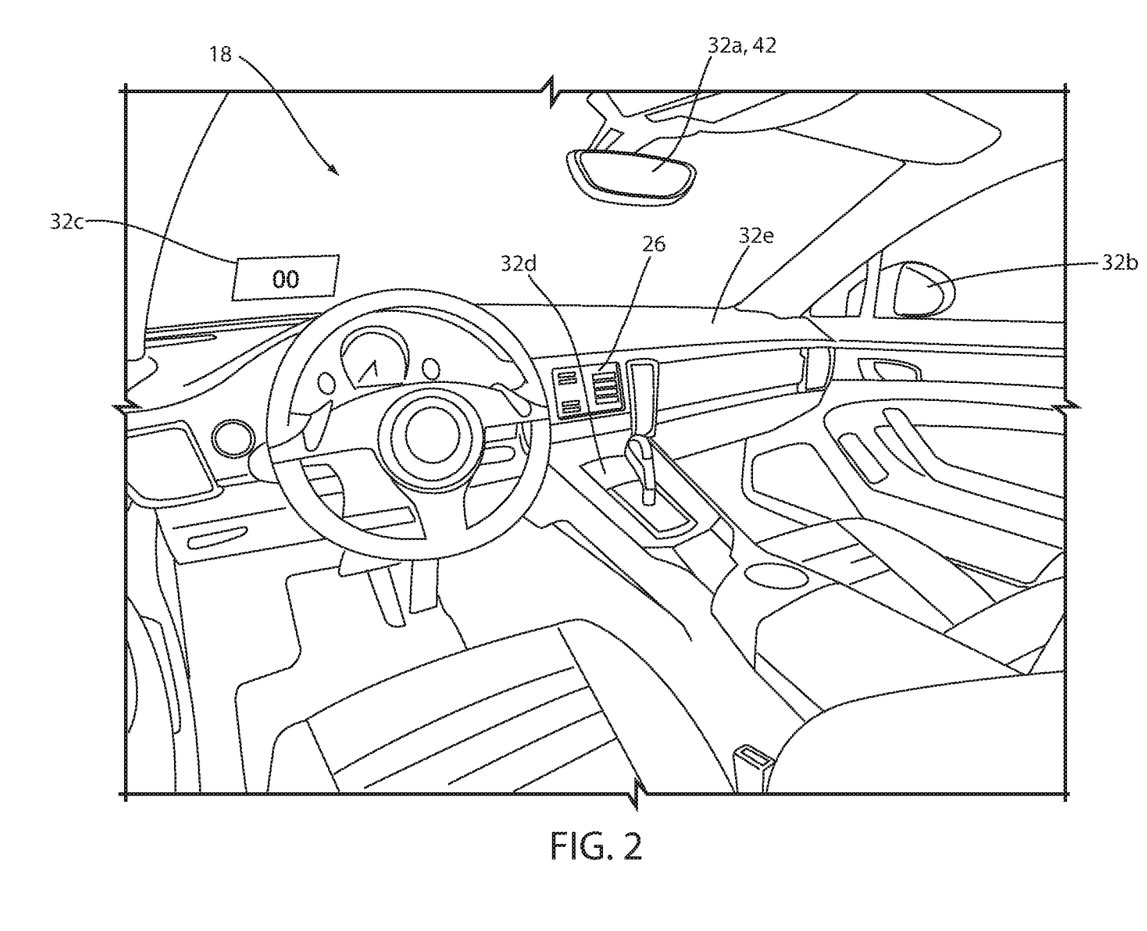
FIG. 2 is a projected view of a vehicle interior demonstrating an authentication system configured to identify an occupant of a vehicle.

FIG. 2 demonstrates a passenger cabin 18 of the vehicle 10. Referring now to FIGS. 1 and 2, in some embodiments, a second scanning apparatus 14b may be disposed within the passenger cabin 18 of the vehicle 10. In some embodiments, a second scanning apparatus 14b may be in communication with the authentication system 12 and configured to capture second scanning data. The second scanning data may be processed by the authentication system 12 to identify a privilege level associated with the occupant 24 indicating a variety of authorized operational privileges and/or administrative privileges available to the occupant 24. The second scanning apparatus 14b may be incorporated as a component in one or more of an interior rearview mirror 32a, an exterior rearview mirror 32b, a heads-up display 32c, an interior console 32d, a dash 32e, or other locations of the passenger cabin 18. In this way, the authentication system 12 may provide various levels of security and operating privileges to ensure that the occupant 24 is authorized to access and utilize various features of the vehicle 10. Accordingly, the disclosure may provide for a variety of solutions that may be applied to improve secure access and operation of the vehicle 10.

In various embodiments, the authentication system 12 may be configured to utilize one or more communication circuits 34 to transmit or receive data from one or more remote servers or other devices. For example, in some embodiments, a controller of the authentication system 12 may be operable to send authentication data, biometric or scanning data, and various other forms of data to a remote server that may be configured to process the data to authenticate or identify an identification profile as discussed herein. Additionally, the controller may be operable to receive an authentication of the occupant 24, an identification profile, operating parameters or operational privileges for the vehicle 10, a software update or various information related to one or more systems from the remote server. Additionally, in some embodiments, the authentication system 12 may be in communication with the mobile device 28, which may be utilized alone or in combination with the scanning apparatuses 14 to capture the biometric and/or scanning data.

The biometric and/or scanning data may correspond to various forms of data, which may be configured to capture one or more unique or identifying characteristics of the occupant 24. The biometric data may correspond to image data, audio data, or various forms of sensory data. Such data may be utilized by the controller of the authentication system 12 and/or the remote server to process an iris recognition, fingerprint recognition, voice recognition, face recognition, gesture recognition or various forms of biometric processing that may be captured by the scanning apparatus(es) 14. Accordingly, the authentication system 12 may be configured to authenticate an identity of the occupant 24 in a variety of ways to suit a desired application.

In implementations that utilize the one or more communication circuits 34 to communicate with the mobile device 28 and/or the remote server, the authentication system 12 may be in communication with a communication network operable to connect to a server, the internet, and/or a portal configured to securely communicate information. For example, the authentication system 12 and/or the mobile device 28 may comprise one or more communication circuits 34 configured to communicate with a private server (e.g. a security provider). Further details describing the authentication system 12, the mobile device 28, and the remote server are discussed in reference to FIG. 5.

Figure 3:
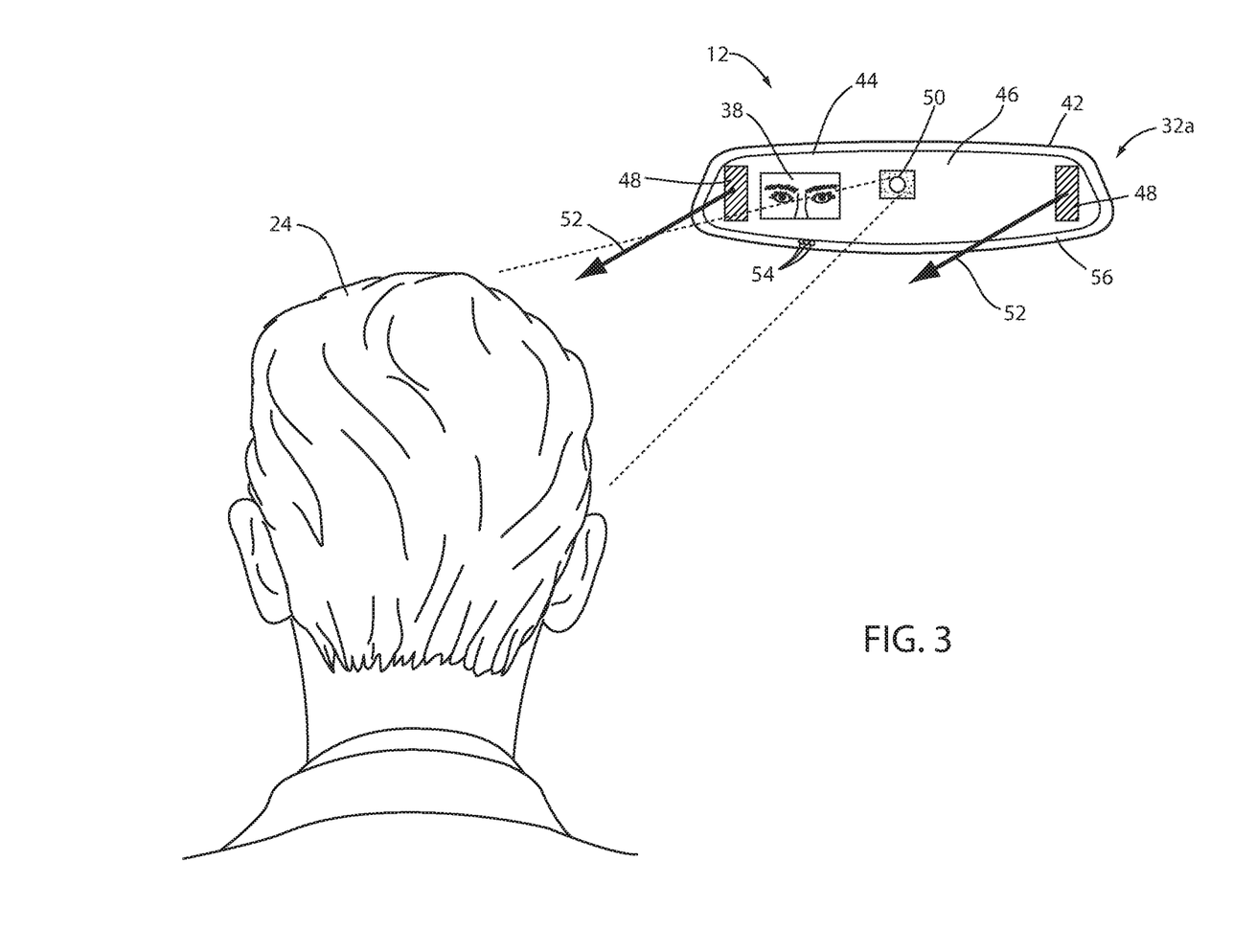
FIG. 3 is a schematic diagram of an scanning apparatus for a vehicle.

Referring now to FIG. 3, an exemplary embodiment of the scanning apparatus 14, 14a is shown. As discussed herein, the scanning apparatus 14, 14a may be operable to perform an identification or authentication function. In an exemplary embodiment, the scanning apparatus 14 is shown incorporated in an interior rearview mirror assembly 42. The mirror assembly 42 may correspond to an electro-optic assembly 44 having an electrochromic (EC) mirror element. The identification function may correspond to an eye-scan-identification function. In this configuration, the scanning apparatus 14 may provide for an interior rearview mirror assembly 42 configured to authenticate an identity of the occupant 24 based on an eye-scan identification function.

A scanning operation of the scanning apparatus 14 may be initiated by activating an icon representing an "eye," which may be displayed on a display screen 46. The display of the icon may alert the occupant 24 to initiate an identification by positioning his or her face in a particular position. The eye-scan-identification function may utilize an infrared illumination emitted toward an eye of the occupant 24 from one or more emitters 48 to illuminate the eye for the identification. Such illumination may be optimized in conditions allowing for a high optical transmittance in the near infrared (NIR) range. In some embodiments, the disclosure may provide for an electrochromic (EC) stack of the electro-optic assembly 44 that may have a high light transmittance in the NIR range, for example wavelengths of light ranging from 800 nm to 940 nm. Additionally, in some implementations, the electro-optic assembly 44 may comprise a plurality of light sources configured to illuminate at least one iris of the occupant 24 of the vehicle 10.

To provide for the eye-scan-identification function of the authentication system 12, an image sensor 50 may be disposed proximate a rear surface of the electro-optic assembly 44. The image sensor 50 may correspond to, for example, a digital charge-coupled device (CCD) or complementary metal-oxide-semiconductor (CMOS) active pixel sensor, although may not be limited to these exemplary devices. The image sensor 50 may be in communication with the at least one emitter 48. The emitter 48 may correspond to a plurality of infrared emitter banks configured to output an emission 52 in the NIR range. Each of the infrared emitter banks may comprise a plurality of light emitting diodes, which may be grouped in a matrix or otherwise grouped and disposed behind a rear surface of the electro-optic device. In this configuration, the scanning apparatus 14 may be configured to illuminate the eyes of the occupant 24 such that the image sensor 50 may capture image data including details of the irises of the eyes.

The display 38 may be disposed in the mirror assembly 42 and may be operable to display the image data received from the image sensor 50 such that the occupant may view the image data. In this configuration, the occupant 24 may adjust a position of the eyes shown on the display 38 to position the eyes such that the scanning data or biometric data may include the necessary features required to identify the occupant. In an exemplary embodiment, the features required to identify the occupant 24 of the vehicle 10 may correspond to features of one or more of the eyes of the occupant 24 (e.g. the irises).

The display 38 may correspond to a partial or full display mirror configured to display an image data through at least a portion of the mirror assembly 42. The display 38 may be constructed utilizing various technologies, for example LCD, LED, OLED, plasma, digital light processing (DLP) or other display technology. Examples of display assemblies that may be utilized with the disclosure may include U.S. Pat. No. 6,572,233 entitled "Rearview display mirror," U.S. Pat. No. 8,237,909 entitled "Vehicular rearview mirror assembly including integrated backlighting for a liquid crystal display (LCD)," U.S. Pat. No. 8,411,245 entitled "Multi-display mirror system and method for expanded view around a vehicle," and U.S. Pat. No. 8,339,526 entitled "Vehicle rearview mirror assembly including a high intensity display," which are incorporated herein by reference in their entirety.

The scanning apparatus 14 may further comprise an indicator 54 in the mirror assembly 42. The indicator 54 may be in communication with the controller and configured to output a signal to identify a state of the scanning apparatus 14 and/or a rearview camera. The indicator 54 may correspond to a light source that may be operable to flash and/or change colors to communicate a state of the scanning apparatus 14. The indicator 54 may correspond to a light emitting diode (LED), and in an exemplary embodiment, the indicator 54 may correspond to a red, green, and blue (RGB) LED operable to identify the state of the scanning apparatus 14 by outputting one or more colored emissions of light.

The various components of the electro-optic assembly 44 and the scanning apparatus 14 may be contained within a housing 56 of the mirror assembly 42. In this way, the various components discussed herein may be substantially hidden from a view of the occupant 24. Accordingly, the disclosure may provide for various advanced functions from the electro-optic assembly 44 and the scanning apparatus 14 while maintaining an appearance of a conventional rearview mirror.

Figure 4:
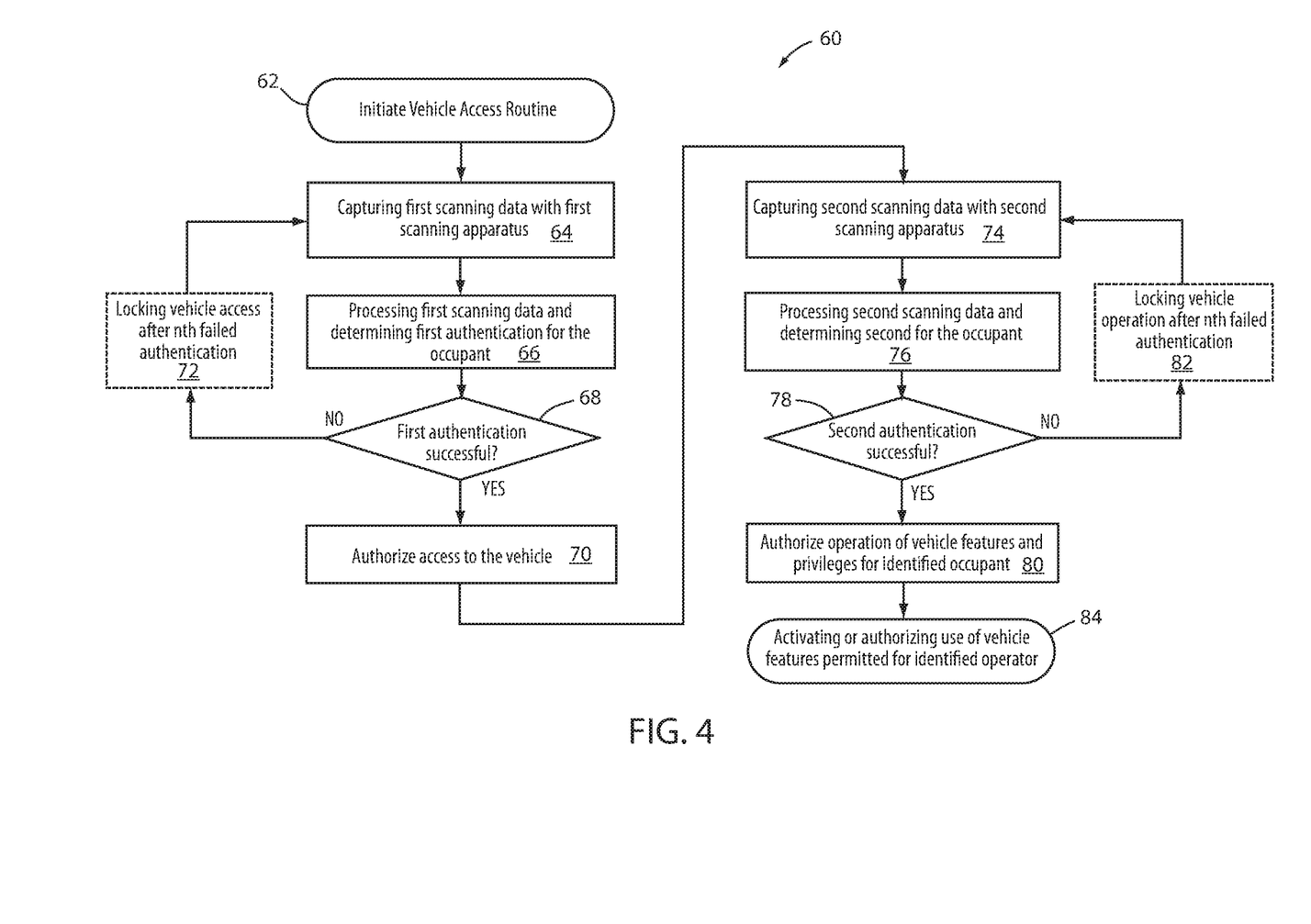
FIG. 4 is a flow chart demonstrating a method for authenticating an identity of an occupant of a vehicle.

Referring to FIG. 4, a method 60 for authenticating an identity of the occupant 24 of the vehicle 10 is shown. The method 60 may begin by initiating a vehicle access routine and/or security authorization in response to an entry requested by the occupant 24 (62). The request may comprise an input into the mobile device 28, a detection of an input to a handle or input device of the vehicle 10 or a variety of control inputs. In response to the request, a controller of the authentication system 12 may activate a first scanning apparatus 14*a* to capture first scanning data (64). The first scanning apparatus 14*a* may be located on an exterior portion 16 outside the vehicle 10 or may be portable as exemplified by a mobile device 28. In this way, the first scanning apparatus 14*a* may capture the first scanning data such that the authentication system 12 may provide for a first authentication to authorize entry into the vehicle 10 and/or load a custom profile including occupant parameters for the occupant 24.

Upon receipt of the first scanning data, the controller may process the data and determine a first authentication for the occupant (66). The first authentication may correspond to voice recognition, face recognition, palm or fingerprint identification and/or a variety biometric scanning and authentication techniques as discussed herein. In an exemplary embodiment, the first scanning data may correspond to data that may be readily captured by one or more video, touch, or audio sensors during a variety of environmental conditions that may be associated with an operating environment of the vehicle 10. In this way, the first authentication may provide for access to the occupant 24 based on a first level of security. The first level of security may be reduced in comparison to a second level of security as later described in favor of ensuring effective access into the vehicle 10 upon authentication.

An authentication may be considered successful if the controller of the authentication system 12 or the remote server identify that the occupant 24 is authorized to enter the vehicle 10. The authorization for the occupant 24 may be identified by processing the first scanning data and matching identifying characteristics of the occupant 24 with an identification profile. If the identification profile includes user privileges to enter the vehicle 10, the authentication system 12 may grant access to the occupant. If the first authentication is successful in step 68, the authentication system 12 may communicate with the vehicle control system 22 to grant access to the passenger cabin 18 of the vehicle 10 (70). If the occupant is not identified as an authorized user in step 68, the controller may return to step 64. After a predetermined number of failed attempts (e.g. n failed attempts), the controller also may lock the authentication process and halt the method 60 and/or prevent entry to the vehicle 10 (72).

Once inside the vehicle 10, the occupant 24 may further be prompted to submit to an additional authentication. Accordingly, the method 60 may continue to capture second scanning data with the second scanning apparatus 14*b* (74). The second scanning data may be processed by the authentication system 12 to identify a privilege level associated with the occupant 24 (76). If successful, the second authentication may access an identification profile for the occupant indicating a variety of authorized operational privileges and/or administrative privileges.

The second scanning data may be processed by the authentication system 12 at a second security level that may be higher than that applied to the first scan data. In this way, the authentication system 12 may be operable to identify a security authorization or privilege level associated with the occupant 24 indicating a variety of authorized operational privileges and/or administrative privileges. As previously discussed, the second scanning apparatus 14*b* may be incorporated as a component in one or more of an interior rearview mirror 32*a*, an exterior rearview mirror 32*b*, a heads-up display 32*c*, an interior console 32*d*, a dash 32*e*, or other locations of the passenger cabin 18. In this way, the authentication system 12 may provide various levels of security and operating privileges to ensure that the occupant 24 is authorized to utilize various features and vehicle controls once the passenger cabin 18 is accessed.

If the second authentication is successful in step 78, the authentication system 12 may activate the privilege level and associated features and vehicle controls authorized for the occupant (80). As discussed herein, the privileges and features activated for the vehicle 10 may include a variety of operating parameters and settings as well as operational or administrative privileges. If the occupant is not identified as an authorized user in step 78, the controller may return to step 74. After a predetermined number of failed attempts (e.g. n failed attempts), the controller also may lock the authentication process and halt the method 60 and/or prevent entry to the vehicle 10 (82).

Upon authorization in step 80, the method 60 may continue to step 84. In step 84, the authentication system 12 may complete the authorization routine by granting access, loading settings, or otherwise controlling use of one or more systems of the vehicle 10 in conformance with the settings and privileges identified in the profile or account authenticated for occupant 24 (84). Accordingly, the method may provide for a tiered authentication process configured to first grant access to the vehicle at a first security level and then activate vehicle features, settings, and/or privileges and administrative controls at second security level.

Figure 5:
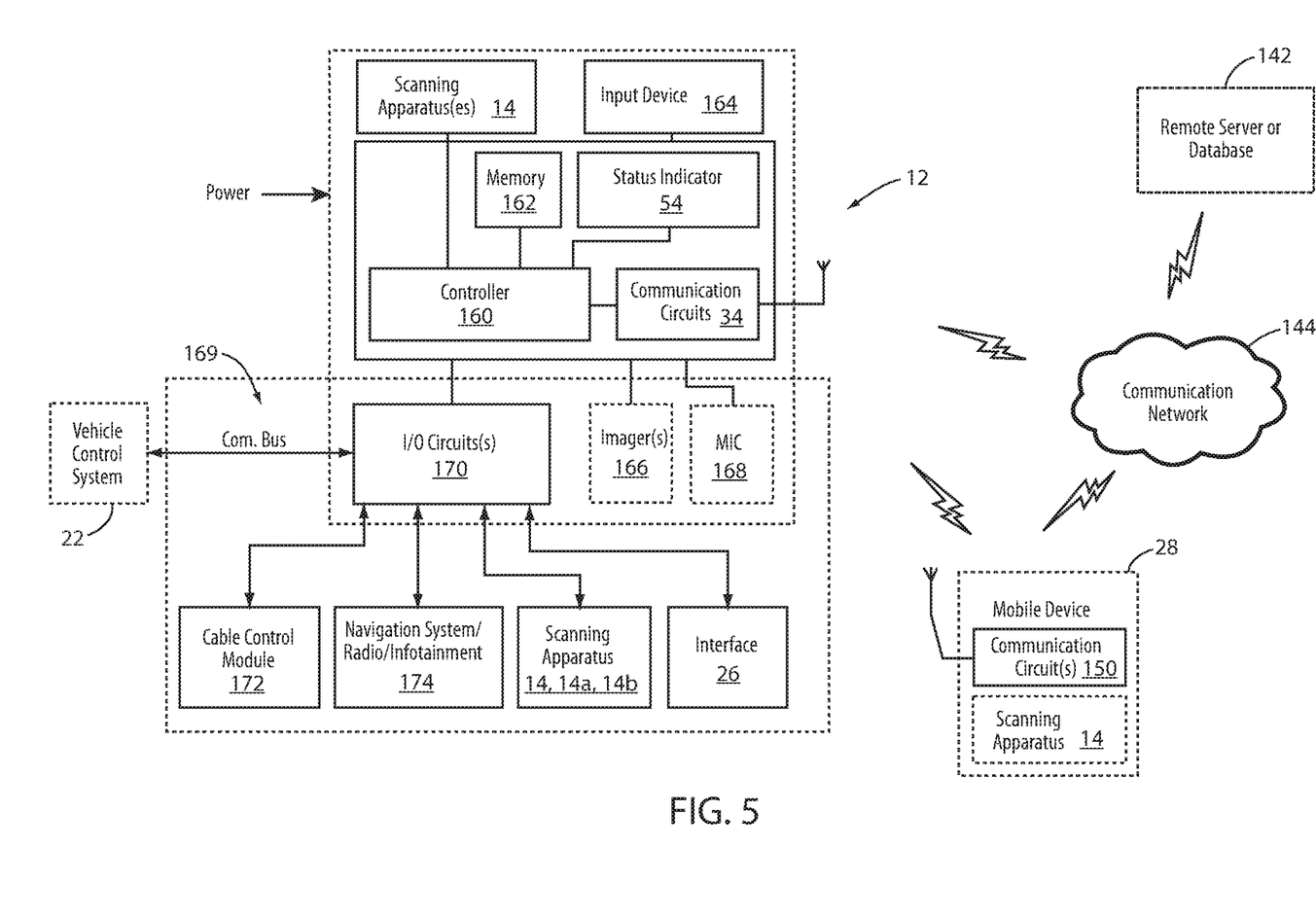
FIG. 5 is a block diagram of an authentication system demonstrated in communication with a remote server or database in accordance with the disclosure.

The method 60 may be applied to set a wide variety of preference settings. For example, the authentication system 12 may be in communication with various vehicle systems configured to control one or more of the following settings or occupant parameter: a seat position, preset configurations (e.g. stations, light/display settings), themes, colors, control preferences, and various additional configurable attributes of the vehicle 10. The systems configured to control these settings as well as others discussed herein may be in communication with the authentication system 12 via the vehicle control system 22, which may be configured to control the systems via the vehicle bus as illustrated in FIG. 5. In this way, the authentication system 12 may provide for the occupant parameters to be automatically activated, configured, and/or loaded in response to the profile or account authenticated for occupant 24.

Additionally, the method 60 may be configured to control a privilege level identifying various features, controls, and/or functions of the vehicle 10. For example, a privilege level may indicate whether the occupant 24 is authorized to modify or control various features of the vehicle 10. Functions that may be controlled by the authentication system 12 may include, but are not limited to, a software update routine privilege, a vehicle operation privilege, an identification training routine privilege, a user preset control privilege, an operational speed control setting privilege, a geographic travel restriction privilege, and various other operational controls that may be associated with the vehicle 10.

Referring now to FIG. 5, a block diagram of the authentication system 12 is shown in communication with a remote server 142 or database in accordance with the disclosure. The authentication system 12 may incorporate or be in communication with various input devices, transducers, and/or sensors. Such devices may be commonly referred herein as scanning apparatuses 14 for clarity. The scanning apparatuses 14 may be configured to capture data and/or receive inputs from various vehicle systems and/or be configured to capture and communicate data with the authentication system 12. The authentication system 12 may then authenticate and determine an identity of the occupant 24 or potential occupant of the vehicle 10 to control or access preference settings, operating parameters, and/or administrative or operational privileges for the vehicle 10.

In an exemplary embodiment, the authentication system 12 may comprise the one or more communication circuits 34 that may be configured to communicate with the mobile device 28, a remote server 142, and/or any device connected via a compatible communication network 144 or interface. The communication network 144 may correspond to various forms of wireless communication, for example Bluetooth, Bluetooth Low-energy (BT-LE), Near Field Communication (NFC), and/or the like. Examples of standards related to NFC include ISO 18000-3, ISO 13157, and the like, and examples of standards related to BT-LE include IEEE 802.15.1, and the like. Additionally, the communication network 144 may be configured to operate using one or more of a plurality of radio access technologies including one or more of the following: Long Term Evolution (LTE), wireless local area network (WLAN) technology, such as 802.11 WiFi, and the like, and other radio technologies as well.

In implementations that utilize the mobile device 28 as a scanning apparatus 14 in an authentication process, the mobile device 28 may be operable to connect to a server, the internet, and/or a portal configured to receive an authentication. For example, the mobile device 28 may comprise one or more communication circuits 150 similar to those discussed herein to communicate with the remote server 142 to process or perform one or more of the authentication task or routines based on an identification profile. In various embodiments, the identification profile may be stored on the mobile device 28 and/or the remote server 142. In this configuration, the mobile device 28 may process or complete one or more of the authentication routines or methods discussed herein and communicate an authentication or identification profile to the authentication system 12 to identify the occupant 24.

The remote server 142 may comprise one or more identification or authentication databases. The databases may be accessible remotely by the authentication system 12 and/or the mobile device 28 via the communication circuits 34, 150 in communication with the remote server 142. The databases stored on the remote server 142 may be configured to store identification profiles, operational privileges and/or administrative privileges, or any other information related to the operation of the vehicle 10 and/or the authentication system 12. Additionally, the remote server 142 may be configured to process and scan biometric data or scanning data to communicate identifications, authentications, validations of authorization to the authentication system 12 and/or the mobile device 28. Accordingly, the authentication system 12 and/or the mobile device 28 may access one or more identification or authentication databases remotely via communication circuits 34, 150 in communication with the remote server 142.

In some embodiments, the authentication system 12 may be configured to compare and/or process the data received from the scanning apparatuses 14 to authenticate or identify a security confidence corresponding to a percent likelihood that an identity of a party to a transaction is authentic. Based on the confidence determination, the authentication system 12 may require an additional authentication which may be completed utilizing a different scanning apparatus 14 or scanning technology. For example, if a voice recognition authentication returned a low authentication confidence, the authentication system 12 may request a secondary authentication with an iris scanning device (e.g. the scanning apparatus 14 of the mirror assembly 42). In this way, the authentication system 12 may ensure a minimum confidence for the authentication.

The authentication system 12 may comprise a controller 160 configured to control various components and/or integrated circuits of the system 12. The controller 160 may include various types of control circuitry, digital and/or analog, and may include a microprocessor, microcontroller, application-specific integrated circuit (ASIC), or other circuitry configured to perform various input/output, control, analysis, and other functions to be described herein. The controller 160 may be in communication with a memory 162 configured to store one or more routines as discussed herein. The memory 162 may comprise a variety of volatile and non-volatile memory formats.

The controller 160 may be coupled to an input device 164, which may comprise one or more switches, but may, alternatively, include other user input devices, such as, switches, knobs, dials, alpha or numeric input devices, etc. Additionally, the authentication system 12 may comprise various data devices including, but not limited to, the input device 164, one or more imagers 166, a microphone 168, and various other sensors or inputs that may be implemented in the vehicle 10. Data received by each of the sensors or scanning apparatuses 14 may be processed by the controller 160 or the remote server 142 to identify or authenticate the occupant 24.

As discussed herein, the authentication system 12 may be in communication with a variety of vehicle systems. For example, the authentication system 12 is shown in communication with the vehicle control system 22 via a communication bus 169. Additionally, the controller 160 may be in communication with a plurality of vehicle systems via one or more input-output (I/O) circuits 170. For example, the authentication system 12 may be in communication with a cabin control module 172 configured to adjust a seat position, comfort setting, and/or window setting corresponding to a control preference or setting of the occupant 24.

Still referring to FIG. 5, in some embodiments, the control system 12 may be in communication with one or more additional systems of the vehicle 10 via the I/O circuits 170. The I/O circuits 170 may be in communication with various devices or vehicle accessories. For example, the I/O circuits 170 may be in communication with a navigation system 174, one or more scanning apparatuses 14 and any other form of vehicle accessory or device incorporated in the vehicle 10. The controller 160 may receive location data from a Global Positioning System (GPS) module incorporated in the navigation system 174. Though described as a navigation system, the system may correspond to a radio, infotainment system, HMI, or a variety of guidance or entertainment systems that may be implemented in the vehicle 10. Accordingly, the authentication system 12 may be operable to update various settings to customize various presets, themes, and settings that may be associated with various vehicle accessories as discussed herein.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An authentication system in communication with a vehicle control system of a vehicle and a first scanning apparatus configured to capture first scanning data, the first scanning apparatus incorporated in a mobile device separate from the vehicle and in communication with a remote server, the authentication system comprising:
   a second scanning apparatus configured to capture second scanning data, the second scanning apparatus accessible from an interior of the vehicle, wherein the second scanning device is incorporated in the vehicle and in communication with the remote server; and
   a controller in communication with the scanning apparatuses, wherein the controller is configured to:
      receive an authorization from the remote server for entry into the vehicle based on first scanning data captured by the first scanning device;
      grant access to a passenger cabin of the vehicle based on at least one communication from the remote server indicating that the first scanning data is associated with an authorized occupant;
      capture the second scanning data with the second scanning apparatus;
      process the second scanning data to verify the authorized occupant has a privilege level for operation of the vehicle based on the second scanning data and the at least one communication from the remote server;
      compare the first scanning data and the second scanning data from the scanning apparatuses and identify a security confidence of the authentication indicating a likelihood that the identity of the occupant is authentic; and
      based on the security confidence, activate the privilege level for an identification profile of the authorized occupant based on the second scanning data, wherein the privilege level defines a level control of one or more systems of the vehicle.

2. The authentication system according to claim 1, wherein the privilege level designates the security authorization for one or more user privileges comprising at least one of a vehicle operation privilege, an identification training routine privilege, a software update routine privilege, and a user preset control privilege.

3. The authentication system according to claim 1, wherein the second scanning data comprises biometric data and wherein the controller is further operable to:
   process at least one of an iris recognition, a fingerprint recognition, a voice recognition, a face recognition, and a gesture recognition.

4. The authentication system according to claim 1, wherein the privilege level is configured to activate a plurality of operating parameters for the vehicle.

5. The authentication system according to claim 4, wherein the operating parameters comprise at least one of a navigation setting, a radio station preset, a selection of a decorative theme, a seat position setting, a mirror setting, and a driver assist system setting.

6. The authentication system according to claim 4, wherein the operating parameters comprise information identifying a payment account and an authorization to apply a charge to the payment account.

7. The authentication system according to claim 1, wherein the second scanning apparatus is not accessible for operation from the exterior of the vehicle.

8. The authentication system according to claim 1, wherein the first scanning device is a mobile device in communication with the authentication system via a wireless communication interface.

9. The authentication system according to claim 1, wherein the second scanning device is a biometric scanner disposed in a passenger cabin of the vehicle.

10. The authentication system according to claim 1, further comprising:
    a communication circuit configured to communicate with the remote server in communication with the controller.

11. The authentication system according to claim 10, wherein the controller is further configured to:
receive authentication data from the remote server and process.

12. The authentication system according to claim 11, wherein the controller is further configured to:
process a comparison of the first scanning data or the second scanning data based on the authentication data received from the remote server.

13. The authentication system according to claim 10, wherein the remote server comprises a database of authentication data and is configured to process a comparison of the first scanning data or the second scanning data and communicate at least one of an indication of the authorized occupant and the identification profile to the controller.

14. A method for authorizing a use of a vehicle via a mobile device and a scanning device incorporated in the vehicle, wherein the use of the vehicle is initiated via a mobile device separate from the vehicle, wherein the mobile device is configured to capture a first scanning data and process a first comparison of the first scanning data a first authentication data based on at least one communication with a remote server, the method comprising:
receiving an authorization for entry into the vehicle from the remote server based on first scanning data;
granting access to a passenger cabin based on the first comparison indicating an authorized occupant;
capturing a second scanning data with the scanning device in the passenger cabin;
processing a second comparison of the second scanning data to the second authentication data based on the at least one communication with the remote server;
comparing the first scanning data and the second scanning data from the scanning apparatuses and identify a security confidence of the authentication indicating a likelihood that the identity of the occupant is authentic;
based on the security confidence, controlling a privilege level for the identification profile of the authorized occupant based on the second scanning data; and
activating one or more systems of the vehicle for use in response to the privilege level.

15. The method according to claim 14, further comprising:
accessing at least one of the first authentication data and the second authentication data via the remote server.

16. The method according to claim 15, wherein at least one of the first comparison and the second comparison is processed by the remote server.

17. An authentication system in communication with a vehicle control system of a vehicle and a first scanning apparatus configured to capture first scanning data, the first scanning apparatus incorporated in a mobile device separate from the vehicle and in communication with a remote server, the authentication system comprising:
a communication circuit configured to communicate with the remote server;
a second scanning apparatus configured to capture second scanning data, the second scanning apparatus incorporated in an interior of the vehicle; and
a controller in communication with the communication circuit and the scanning apparatuses, wherein the controller is configured to:
receive an authorization from the remote server for entry into the vehicle based on first scanning data captured by the first scanning device;
grant access to a passenger cabin of the vehicle based on the first scanning data indicating an authorized occupant;
capture the second scanning data with the second scanning apparatus;
access a second authentication data via the remote server;
compare the first scanning data and the second scanning data from the scanning apparatuses and identify a security confidence of the authentication indicating a likelihood that the identity of the occupant is authentic; and
based on the security confidence, activate a privilege level for the identification profile based on the second scanning data, wherein the privilege level defines a level control of one or more systems of the vehicle.

18. The system according to claim 17, wherein the scanning data is processed via the remote server indicating the authorized occupant and the privilege level.

* * * * *

UNITED STATES PATENT AND TRADEMARK OFFICE
CERTIFICATE OF CORRECTION

PATENT NO. : 10,824,704 B2  
APPLICATION NO. : 15/881006  
DATED : November 3, 2020  
INVENTOR(S) : Weller et al.

Page 1 of 1

It is certified that error appears in the above-identified patent and that said Letters Patent is hereby corrected as shown below:

Column 13, Line 21, Claim 14, after "data" (second occurrence) insert -- and --.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*